(12) United States Patent
Liang

(10) Patent No.: US 7,544,044 B1
(45) Date of Patent: Jun. 9, 2009

(54) TURBINE AIRFOIL WITH PEDESTAL AND TURBULATORS COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 404 days.

(21) Appl. No.: 11/503,545

(22) Filed: Aug. 11, 2006

(51) Int. Cl.
*F01D 5/18* (2006.01)
(52) U.S. Cl. .................................. 416/96 R; 416/97 R
(58) Field of Classification Search ................ 415/115, 415/178; 416/96 R, 97 R, 97 A
See application file for complete search history.

(56) References Cited

U.S. PATENT DOCUMENTS

| | | | |
|---|---|---|---|
| 4,407,632 A | 10/1983 | Liang | |
| 4,515,523 A | 5/1985 | North et al. | |
| 5,370,499 A | 12/1994 | Lee | |
| 5,690,472 A | 11/1997 | Lee | |
| 6,769,875 B2 * | 8/2004 | Tiemann | 416/97 R |
| 6,808,367 B1 | 10/2004 | Liang | |
| 6,981,840 B2 | 1/2006 | Lee et al. | |
| 6,984,102 B2 | 1/2006 | Bunker et al. | |
| 6,984,103 B2 | 1/2006 | Lee et al. | |
| 7,011,502 B2 | 3/2006 | Lee et al. | |
| 7,186,084 B2 * | 3/2007 | Bunker et al. | 416/96 R |
| 2006/0060334 A1 * | 3/2006 | Joe et al. | 165/109.1 |

* cited by examiner

*Primary Examiner*—Ninh H Nguyen
(74) *Attorney, Agent, or Firm*—John Ryznic

(57) ABSTRACT

A wall enclosing a hot gas path, the wall including a cooling cavity formed between an inner wall and an outer wall, and a plurality of pins extending between walls with a plurality of turbulators within the cooling passage to promote turbulence within the cooling air flow. The turbulators form a zigzag arrangement. The turbulators are angled at about 45 degrees or about 60 degrees from the cooling air flow path. Turbulators are arranged on one wall or both walls, and can be arranged directly across from turbulators on the opposite wall, or offset below and at a mirror image of the other wall.

4 Claims, 3 Drawing Sheets

US 7,544,044 B1

TURBINE AIRFOIL WITH PEDESTAL AND TURBULATORS COOLING

BACKGROUND OF THE INVENTION

1. Field of the Invention

The present invention relates generally to power plants and to fluid reaction surfaces, and more specifically to hot gas flow turbine components with internal cooling.

2. Description of the Related Art Including Information Disclosed Under 37 CFR 1.97 and 1.98

Gas turbine engines—either aero engines used in aircraft or industrial gas turbines used to produce electric power—make use of a high temperature turbine to convert a hot gas flow into mechanical work by rotatably driving the turbine shaft. The efficiency of a gas turbine engine can be increased by pass into the turbine a higher temperature flow, since the energy content of the flow is proportional to the temperature of the flow. However, the hot gas flow temperature is limited to the material properties of the components of the turbine such as the rotor blades and the stationary vanes or nozzles.

In order to allow for a higher gas flow temperature using the same materials, internal air cooling of turbine airfoils such as blades and vanes has been used. Since the cooling air used to pass through the airfoils is usually drawn off from the compressor (known as bleed off air), the efficiency of the engine can also be increased my using a minimal amount of bleed off air. Therefore, the use of the cooling air passing through the internal passages of the turbine airfoils is also a key design feature of engineers such that the cooling efficiency of the passing air can be maximized.

Turbine airfoils have complex internal cooling air passages in order to improve heat transfer from the airfoil to the cooling air. Because of this complexity, some parts of the airfoil may be cooled too much while other parts may not be cooled enough. Also, centrifugal forces (in rotor blades) and air flow at boundary layers often prevent some areas of the turbine blade from being adequately cooled, which results in the formation of localized hot spots. Localized hot spots, depending upon their location, can reduce the useful life of a turbine blade and can damage a turbine blade to an extent necessitating replacement of the blade.

Other components in the gas turbine engine are exposed to the hot gas flow besides the turbine airfoil. The combustor includes walls that are sometimes cooled by passing a cooling air through passages formed within the walls. The ideas of the present invention could also be used to promote the heat transfer effect from the component to the cooling air passing through the component.

One prior art invention, U.S. Pat. No. 6,808,367 B1 issued to Liang on Oct. 26, 2004 entitled COOLING SYSTEM FOR A TURBINE BLADE HAVING A DOUBLE OUTER WALL discloses an airfoil formed by an inner wall and an outer wall, in which a plurality of pedestals (#46 in this patent) extend between the inner wall and the outer wall and a plurality of protrusions. (#54 in this patent) positioned between the pedestals in order to create a spiral flow of the cooling air through the cooling passage in the airfoil. The spiral flow path improves the heat transfer from the walls of the airfoil to the cooling air without increase the cooling air flow rate. In this Liang patent, the protrusions can extend from the inner wall, from the outer wall, or from both the inner and the outer walls.

U.S. Pat. No. 6,984,102 B2 issued to Bunker et al on Jan. 10, 2006 entitled HOT GAS PATH COMPONENT WITH MESH AND TURBULATED COOLING discloses an improvement from the above Liang patent. Pins (#18 in this patent) extend between the inner wall and the outer wall like in the Liang patent above, but include turbulators plates (#36 in this patent) that extend from pin to pin, and also extend toward the opposing wall. The pins are arranged along a transverse direction of the cooling flow, or angled with respect to the transverse direction, or with alternating segmented turbulators. The Bunker et al patent arranges the pins to form a mesh arrangement with turbulators on at least one of the walls in order to provide an enhanced cooling effectiveness for hot gas components having thin airfoil walls.

It is an object of the present invention to improve the efficiency of a gas turbine engine. It is another object of the present invention to improve the heat transfer from the hot airfoil surface to the cooling air passing through the airfoil. It is another object of the present invention to increase the turbulence of the cooling air flow passing through an arrangement like the Liang patent and the Bunker patent described above.

BRIEF SUMMARY OF THE INVENTION

An airfoil for a gas turbine engine in which the cooling passage formed between walls of the airfoil include a plurality of pedestals (or pins) extending between the two walls to form a spiral flow path for the cooling air passing between the walls and around the pedestals, and where turbulators extend from the pedestals in an arrangement in a zigzag manner at an angle of about 45 degrees or 60 degrees. In another embodiment, the turbulators extend from the opposite wall forming the passage with an inverted arrangement to produce turbulent flow. The zigzag arrangement of the turbulators improves the heat transfer from the airfoil to the cooling air over the above described prior art arrangements. The turbulators on one wall are offset in the radial direction from turbulators on the opposite wall to form a serpentine flow path along the passage within the walls. Also, the two walls in which the trip strips and pin fins extend from are both exposed to a hot gas flow so that near-wall cooling of the two walls is required.

DETAILED DESCRIPTION OF THE INVENTION

Figure 1:
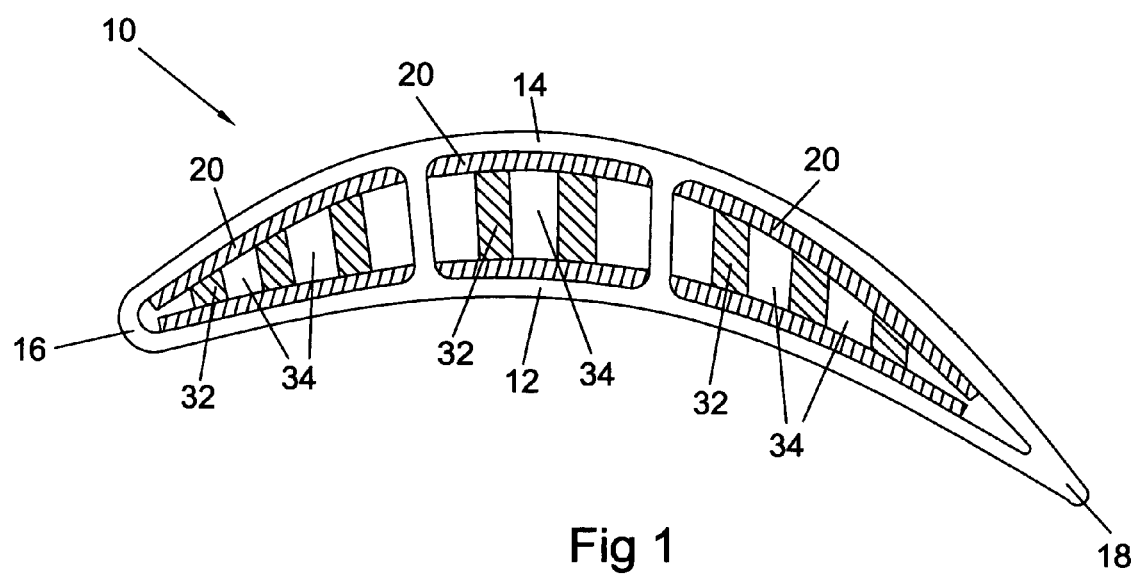
FIG. 1 shows a cut-away view of an airfoil of the present invention with three cavities, each with pins connected between walls forming the cavity.

The present invention is a turbine airfoil such as a rotor blade or a stationary vane (also known as a nozzle) as shown in FIG. 1 represented by number 10. The airfoil 10 includes a pressure side wall 12 and a suction side wall 14, a leading edge 16 and a trailing edge 18 that define the airfoil shape. A plurality of cavities is formed within the airfoil body and forms the cooling air passages. FIG. 1 shows three cavities 34, each having a plurality of pins 32 extending from the pressure side wall 12 to the suction side wall 14. Turbulators 20 or skew trip strips extend from the inner surface of the walls and into the cavities 34 to produce turbulence in the cooling air flow through the cavity 34.

Figure 2:
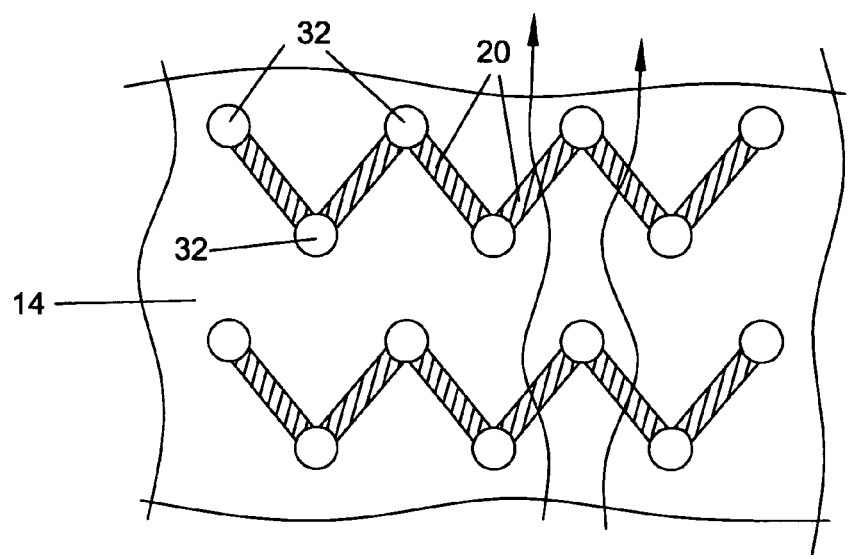
FIG. 2 shows a cross section view of a wall of the present invention with pins and turbulators extending therefrom.

FIG. 1 shows a cross section view of the pins and turbulators arrangement for the first embodiment of the present invention. The inner surface of the suction side wall 14 is shown having a plurality of pins 32 extending from the wall 14 toward and into the suction side wall 12 of the airfoil 10. One row of pins 32 are spaced according the prior art. A second row of pins below the first row are spaced accordingly but offset such that one pin is located midway between adjacent pins on the row above. The third row of pins repeats the first row of pins 32. The turbulators (skew trip strips) 20 are arranged such that a W-shape is formed between pins in the first and second rows. This W-shape arrangement produces the skew trip strip result of the present invention. The turbulators 20 can be angled at about 45 degrees with respect to the direction of air flow through the airfoil as shown in FIG. 2, or can be angled at about 60 degrees in order to increase the turbulent flow within the cooling air passage over the prior art turbulators arrangements of the above mentioned Bunker et al patent. The arrangement of turbulators shown on the inner surface of the suction side wall 14 would be also arranged on the inner surface of the pressure side wall but offset in the airfoil spanwise direction. The direction of the cooling air flow through the pins would be as shown by the two arrows in FIG. 1 (i.e., from bottom to top of the Figure).

Figure 3:
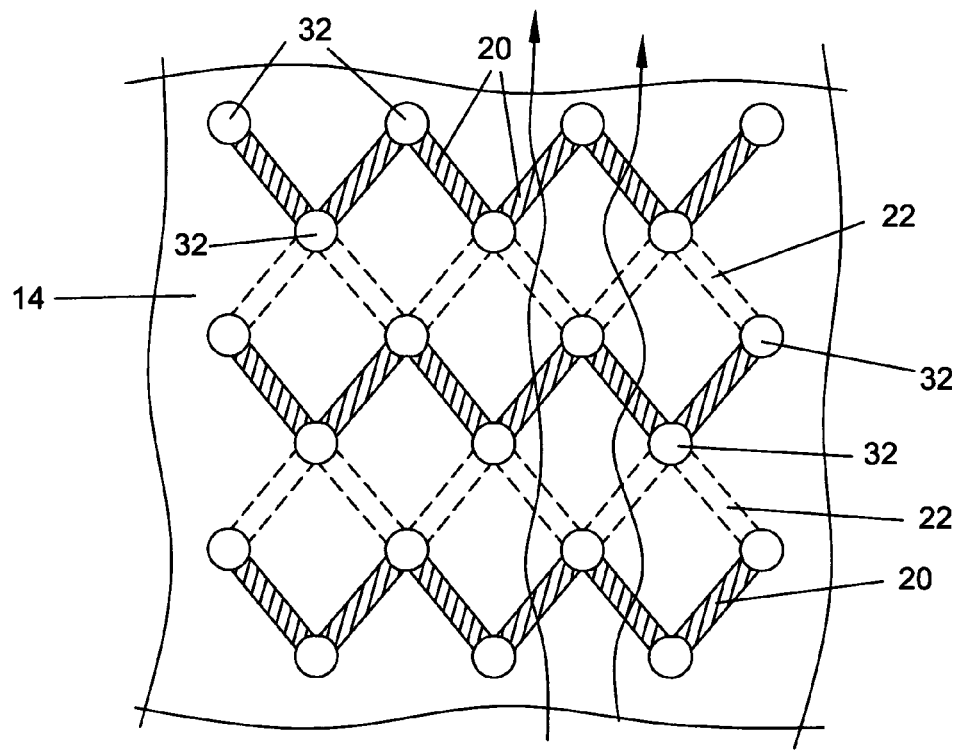
FIG. 3 shows a cross section view of the first embodiment of the present invention with the solid pins representing trip strips on one wall and the dashed lines representing trip strips on the opposite wall.

FIG. 3 shows the first embodiment of the present invention with the trip strips 20 on one wall represented by the solid lines and the trip strips 22 on the opposite wall represented by the dashed lines. The tip strips 20 on the one wall are radial offset from the tip strips 22 on the opposite wall so that an alternating arrangement of trip strips are formed in the radial or spanwise direction of the airfoil. The pin 32 and turbulators 20 arrangements in FIG. 3 for the suction side wall 14 is the same as in FIG. 2. However, the difference is that the turbulators on the pressure side wall are arranged between pins as represented by the dashed lines as reference numeral 22. Instead of the pressure side wall turbulators mirroring the suction side wall turbulators, the turbulators are inverted (upside down with respect to the opposed side of turbulators) and drop one row of pins. The turbulators on the suction side wall 14 form a W-shape arrangement, while the turbulators on the pressure side wall form an M-shape arrangement. Again, the turbulators can have an angle of 45 degrees or 60 degrees with the airflow through the 6, pins represented by the arrows in FIG. 3. The M-shape and the W-shape description are for purposes of explaining the difference between turbulators on opposed sides of the cooling channel formed between the walls 12 and 14. A W-shaped formation of turbulators would just as much be an M-shaped formation depending upon if the first and last turbulators are angled upward or downward.

Figure 4:
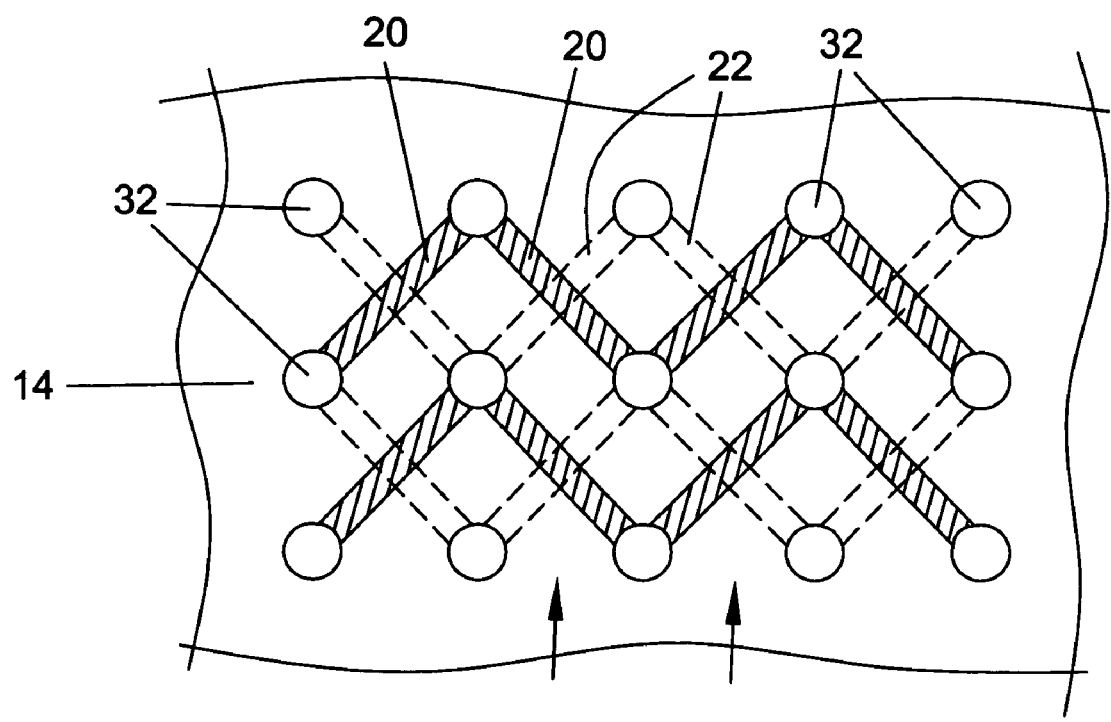
FIG. 4 shows a cross section view of a second embodiment of the present invention with pins and turbulators extending from an opposite wall directly opposed to the pins and turbulators on the other wall.

A second embodiment of the present invention is shown in FIG. 4. The pins 32 are arranged in a square-like manner as clearly shown in FIG. 4. The turbulators 20 extend from pin to pin to form an M-shape or a W-shape configuration on one wall, and form a W-shape or M-shape on the opposite wall. This formation forms a criss-cross arrangement in which the turbulators on one side wall is rotated about 180 degrees on the opposite side wall directly opposing the other turbulators. Turbulators 22 extending from the pressure side wall 12 is represented by the dashed lines in FIG. 4. The arrows also represent the direction of cooling air flow. The turbulators in the FIG. 4 embodiment are not offset in the radial or spanwise direction as they are in the FIG. 3 embodiment, but are reversed such that one side forms a W shape arrangement while the opposite side forms an M shaped arrangement directly across from one another.

FIG. 1 shows the pins extending from the pressure side wall 12 to the suction side 14. However, the present invention with the unique skew trip strips can be used in the airfoil shown in the Liang U.S. Pat. No. 6,808,367 in which the cooling air passage is formed between an inner wall and an outer wall of the airfoil. The pins and turbulators arrangement of the present invention would extend within the cooling air passage formed between the inner wall and the outer wall of the Liang patent.

I claim the following:

1. A turbine airfoil comprising:
a pressure side wall exposed to a hot gas flow;
a suction side wall exposed to the same hot gas flow, the suction side wall being directly opposite to the pressure side wall;
a cooling air channel formed between the pressure side wall and the suction side wall;
a plurality of rows of pin fins extending from the pressure side wall to the suction side wall within the cooling air channel;
a first arrangement of trip strips extending between the pin fins on the pressure side wall within the cooling air channel and forming a W arrangement;
a second arrangement of trip strips extending between the pin fins on the suction side wall within the cooling air channel and forming an M arrangement; and,
the W arrangement of trip strips being radially offset from the M arrangement of trip strips to form an alternating arrangement of M and W trip strips in a radial direction of the cooling air channel.

2. The turbine airfoil of claim 1, and further comprising:
the trip strips are angled from 45 degrees to 60 degrees from the cooling air flow path.

3. A turbine airfoil comprising:
a pressure side wall exposed to a hot gas flow;
a suction side wall exposed to the same hot gas flow, the suction side wall being directly opposite to the pressure side wall;
a cooling air channel formed between the pressure side wall and the suction side wall;
a plurality of rows of pin fins extending from the pressure side wall to the suction side wall within the cooling air channel;
a first arrangement of trip strips extending from the pressure side wall of the cooling air channel and forming an M arrangement of trip strips;
a second arrangement of trip strips extending from the suction side wall of the cooling air channel and forming a W arrangement of trip strips; and,
the M arrangement of trip strips being located directly across from the W arrangement of trip strips.

4. The turbine airfoil of claim 3, and further comprising:
the trip strips are angled from 45 degrees to 60 degrees from the cooling air flow path.

\* \* \* \* \*